(12) United States Patent
Chen et al.

(10) Patent No.: US 11,808,948 B2
(45) Date of Patent: Nov. 7, 2023

(54) OPTICAL MEMBER DRIVING MECHANISM

(71) Applicant: TDK TAIWAN CORP., Taoyuan (TW)

(72) Inventors: Yi-Ho Chen, Taoyuan (TW); Ichitai Moto, Taoyuan (TW); Yi-Liang Chan, Taoyuan (TW); Chen-Chi Kuo, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 185 days.

(21) Appl. No.: 17/101,998

(22) Filed: Nov. 23, 2020

(65) Prior Publication Data

US 2021/0080745 A1 Mar. 18, 2021

Related U.S. Application Data

(63) Continuation of application No. 15/812,461, filed on Nov. 14, 2017, now Pat. No. 10,877,290.

(30) Foreign Application Priority Data

Nov. 7, 2017 (CN) .......................... 201711084636.9

(51) Int. Cl.
*G02B 27/64* (2006.01)
*G02B 7/08* (2021.01)
(Continued)

(52) U.S. Cl.
CPC ........... *G02B 27/646* (2013.01); *G02B 7/023* (2013.01); *G02B 7/08* (2013.01); *G03B 5/04* (2013.01);
(Continued)

(58) Field of Classification Search
CPC .. G02B 27/646; G02B 6/4204; G02B 6/4244; G02B 7/023; G02B 7/08; G02B 7/09;
(Continued)

(56) References Cited

U.S. PATENT DOCUMENTS 6,466,529 B1 10/2002 Kim et al.
2011/0181740 A1 7/2011 Watanabe et al.
(Continued)

FOREIGN PATENT DOCUMENTS

CN 102062926 A 5/2011
KR 20060051593 A * 5/2006 ............. G03B 17/02
(Continued)

OTHER PUBLICATIONS

Office Action dated Apr. 23, 2021 in Chinese Application No. 201711084636.9, 6 pages.

*Primary Examiner* — James R Greece
(74) *Attorney, Agent, or Firm* — Muncy, Geissler, Olds & Lowe, P.C.

(57) ABSTRACT

An optical member driving mechanism is provided, including a movable module, a first driving module, and a position detecting module. The movable module includes an optical member holder and a housing. The first driving module includes a first electromagnetic driving assembly disposed on the optical member holder and a second electromagnetic driving assembly disposed on the housing. The first driving module can drive the optical member holder to move relative to the housing. The position detecting module includes a magnetic member and a position detector. The magnetic member is disposed on the optical member holder. The position detector can detect the position of the optical member holder relative to the housing according to a variation in magnetic field direction.

20 Claims, 13 Drawing Sheets

Related U.S. Application Data

(60) Provisional application No. 62/421,592, filed on Nov. 14, 2016.

(51) Int. Cl.
| | | |
|---|---|---|
| *G03B 5/04* | (2021.01) | |
| *G03B 13/36* | (2021.01) | |
| *G02B 7/02* | (2021.01) | |
| *G01D 5/14* | (2006.01) | |
| *H04N 23/55* | (2023.01) | |
| *H02K 11/215* | (2016.01) | |
| *G02B 7/09* | (2021.01) | |
| *H02K 41/035* | (2006.01) | |

(52) U.S. Cl.
CPC ............ *G03B 13/36* (2013.01); *G01D 5/145* (2013.01); *G02B 7/09* (2013.01); *G03B 2205/0015* (2013.01); *G03B 2205/0069* (2013.01); *H02K 11/215* (2016.01); *H02K 41/0356* (2013.01); *H04N 23/55* (2023.01)

(58) Field of Classification Search
CPC .... H02K 11/215; H02K 41/0356; G01D 5/16; G03B 5/04; G03B 13/36; H04N 5/2254
USPC .......................................................... 359/694
See application file for complete search history.

(56) References Cited

U.S. PATENT DOCUMENTS

| | | |
|---|---|---|
| 2011/0182566 A1 | 7/2011 | Watanabe et al. |
| 2011/0267692 A1 | 11/2011 | Watanabe et al. |
| 2014/0119717 A1 | 5/2014 | Yasuda |
| 2014/0327965 A1 | 11/2014 | Chen et al. |
| 2015/0301353 A1 | 10/2015 | Takeuchi |
| 2015/0331220 A1 | 11/2015 | Shikama et al. |
| 2017/0060645 A1 | 3/2017 | Gasselin De Richebourg et al. |

FOREIGN PATENT DOCUMENTS

| | | |
|---|---|---|
| WO | WO-2015/132571 A1 | 9/2015 |
| WO | WO-2015/133759 A1 | 9/2015 |

\* cited by examiner

OPTICAL MEMBER DRIVING MECHANISM

CROSS REFERENCE TO RELATED APPLICATIONS

This application is a Continuation of application Ser. No. 15/812,461, filed on Nov. 14, 2017, which claims the benefit of U.S. Provisional Application No. 62/421,592, filed Nov. 14, 2016, and China Patent Application No. 201711084636.9, filed Nov. 7, 2017.

BACKGROUND OF THE INVENTION

Field of the Invention

The application relates in general to an optical member driving mechanism, and in particular, to an optical member driving mechanism having a position detector.

Description of the Related Art

As technology has advanced, a lot of electronic devices (such as digital cameras and smartphones) have been given the functionality of taking photographs and recording video. These electronic devices have become more commonplace, and have been developed to be more convenient and thin. More and more choices are provided for users to choose from.

Some electronic devices with the functionality of taking photographs or recording video include a driving mechanism to move an optical member and a position detector to detect the movement of the optical member. However, since electronic devices have become light and thin, the position detector is usually adjacent to a magnetic member in the driving mechanism, and the precision of the detection is therefore reduced. Thus, how to address the aforementioned problem has become an important issue.

BRIEF SUMMARY OF INVENTION

To address the deficiencies of conventional products, an embodiment of the invention provides an optical member driving mechanism, including a movable module, a first driving module, and a position detecting module. The movable module includes an optical member holder and a housing. The first driving module includes a first electromagnetic driving assembly disposed on the optical member holder and a second electromagnetic driving assembly disposed on the housing. The first driving module can drive the optical member holder to move relative to the housing. The position detecting module includes a magnetic member and a position detector. The magnetic member is disposed on the optical member holder. The position detector can detect the position of the optical member holder relative to the housing according to a variation in magnetic field direction.

In some embodiments, the optical member driving mechanism further comprises a fixed module and a second driving module, the second driving module is connected to the movable module and the fixed module and can drive the movable module to move along a second direction relative to the fixed module, wherein the second direction is different from the first direction.

In some embodiments, the second driving module comprises a biasing assembly, connected to the movable module and the fixed module.

In some embodiments, the second driving module further comprises a flexible member, disposed between the movable module and the fixed module and connected to the biasing assembly.

In some embodiments, the position detector is disposed on the flexible member.

In some embodiments, an end of the biasing assembly is affixed to the fixed module.

In some embodiments, the housing comprises a seat, and the position detector is disposed on the seat.

In some embodiments, the optical member driving mechanism is situated above an image sensor, and the position detector is disposed on the image sensor.

In some embodiments, the line of magnetic force in the magnetic member is different from the first direction.

In some embodiments, the line of magnetic force in the second electromagnetic driving assembly is different from the first direction.

In some embodiments, the line of magnetic force in the magnetic member is different from the line of magnetic force in the second electromagnetic driving assembly.

In some embodiments, the position detecting module further comprises a blocking member, disposed between the second electromagnetic driving assembly and the magnetic member.

In some embodiments, the position detecting module further comprises a blocking member, disposed between the second electromagnetic driving assembly and the position detector.

In some embodiments, the first driving module comprises another second electromagnetic driving assembly, the distance between the other second electromagnetic driving assembly and the position detector is greater than the distance between the second electromagnetic driving assembly and the position detector, and the length of the other second electromagnetic driving assembly is greater than the length of the second electromagnetic driving assembly.

In some embodiments, the second electromagnetic driving assembly has a trapezoid-shaped structure, and the inclined leg of the trapezoid-shaped structure faces the position detector.

In some embodiments, the housing comprises a seat having a rectangular structure, wherein the second electromagnetic driving assembly is adjacent to a side of the seat, and the position detector is adjacent to a corner of the seat.

In some embodiments, the housing comprises a seat having a rectangular structure, wherein the second electromagnetic driving assembly is adjacent to a corner of the seat, and the position detector is adjacent to a side of the seat.

In some embodiments, the fixed module comprises a seat, and the projection of the second electromagnetic driving assembly on the seat is separated from the projection of the position detector on the seat.

In some embodiments, the fixed module comprises a seat having a rectangular structure, and the optical member driving mechanism comprises a plurality of position detecting modules, respectively disposed on opposite corners of the seat.

In some embodiments, the fixed module comprises a seat having a rectangular structure, and the optical member driving mechanism comprises a plurality of position detecting modules, disposed on the same side of the seat.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
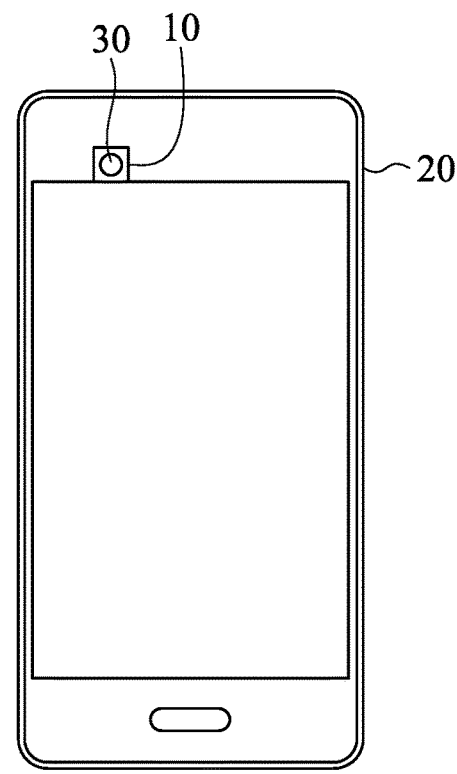
FIG. 1 is a schematic diagram of an electronic device according to an embodiment of the invention.

Referring to FIG. 1, in an embodiment of the invention, an optical member driving mechanism 10 can be disposed in an electronic device 20 and used to hold and drive an optical member 30, so that the optical member 30 can move relative to an image sensor in the electronic device 20, and the purpose of focus adjustment can be achieved. For example, the electronic device 20 can be a digital camera or a smartphone having the function of capturing photographs or making video recordings.

Figure 2:
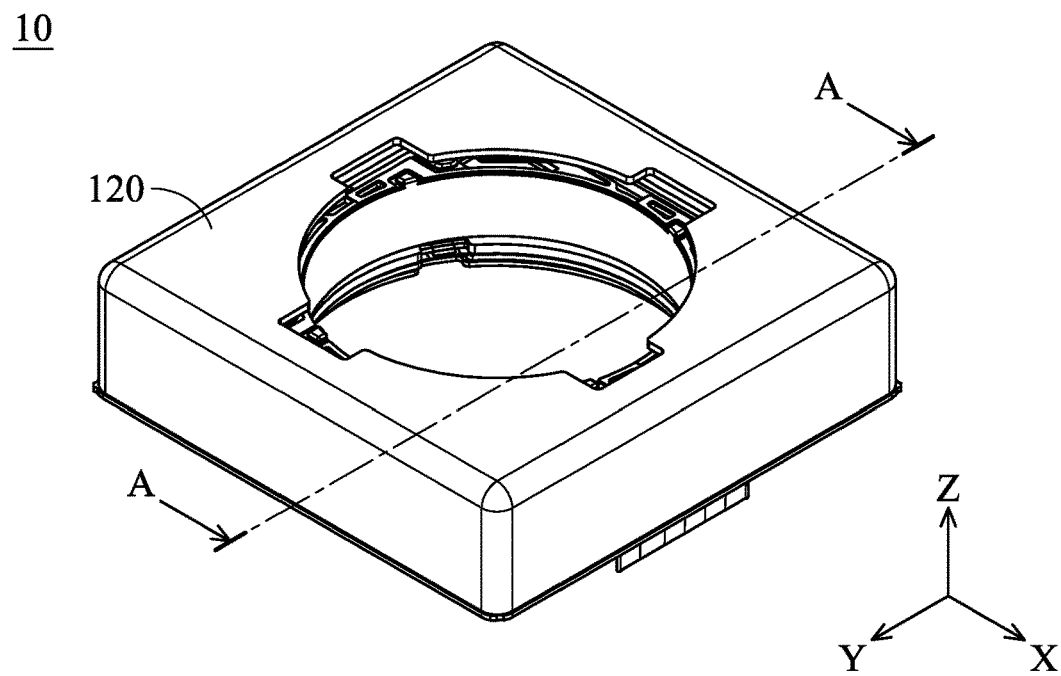
FIG. 2 is a schematic diagram of an optical member driving mechanism according to an embodiment of the invention.
Figure 3:
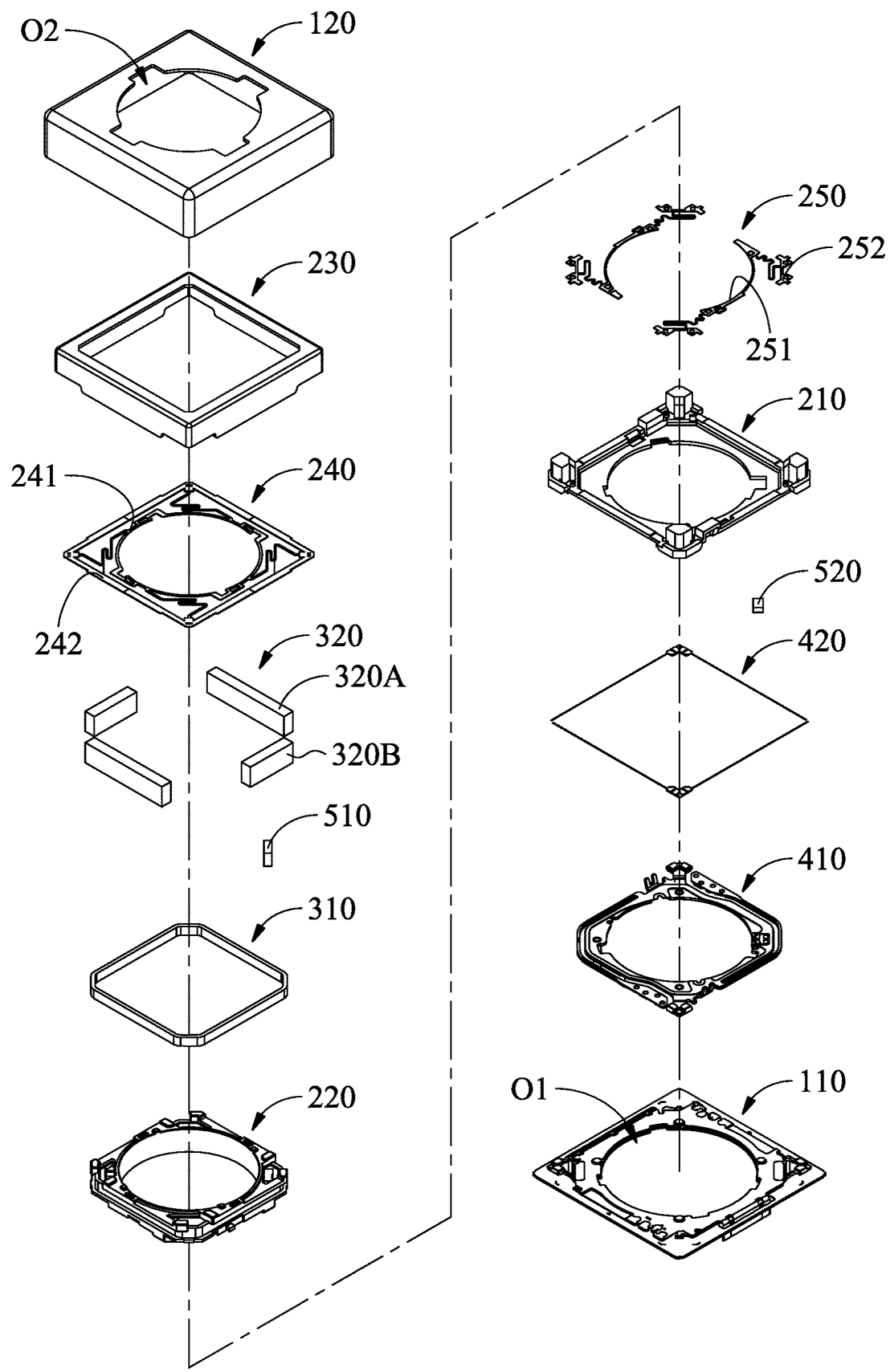
FIG. 3 is an exploded-view diagram of an optical member driving mechanism according to an embodiment of the invention.

Referring to FIGS. 2 and 3, the optical member driving mechanism primarily comprises a fixed module, a movable module, a first driving module, a second driving module, and a position detecting module. The fixed module comprises a seat 110 and an outer frame 120. The movable module comprises a base 210, an optical member holder 220, an inner frame 230, a first elastic member 240, and a second elastic member 250. The first driving module comprises a first electromagnetic driving assembly 310 and at least one second electromagnetic driving assembly 320. The second driving module comprises a flexible member 410 and a biasing assembly 420. The position detecting module comprises a magnetic member 510 and a position detector 520.

The seat 110 and the outer frame 120 of the fixed module can be assembled and form a hollow box. The movable module, the first driving module, the second driving module, and the position detecting module can be surrounded by the outer frame and accommodated in the hollow box. The seat 110 has an optical hole O1 and the outer frame 120 has an optical hole O2 corresponding to the optical hole O1. The light can reach an image sensor in the electronic device 20 through the optical hole O2, the optical member 30, and the opening O1 in sequence.

The inner frame 230 and the base 210 can form a housing. The optical member holder 220 can be hung in the housing by the first elastic member 240 and the second elastic member 250. Specifically, the first elastic member 240 and the second elastic member 250 are respectively disposed on the opposite sides of the optical member holder 220. An inner section 241 and an outer section 242 of the first elastic member 240 are respectively connected to the optical member holder 220 and the housing, and an inner section 251 and an outer section 252 of the second elastic member 250 are also respectively connected to the optical member holder 220 and the housing. Therefore, the optical member holder 220 can be hung by the first elastic member 240 and the second elastic member 250.

Figure 4:
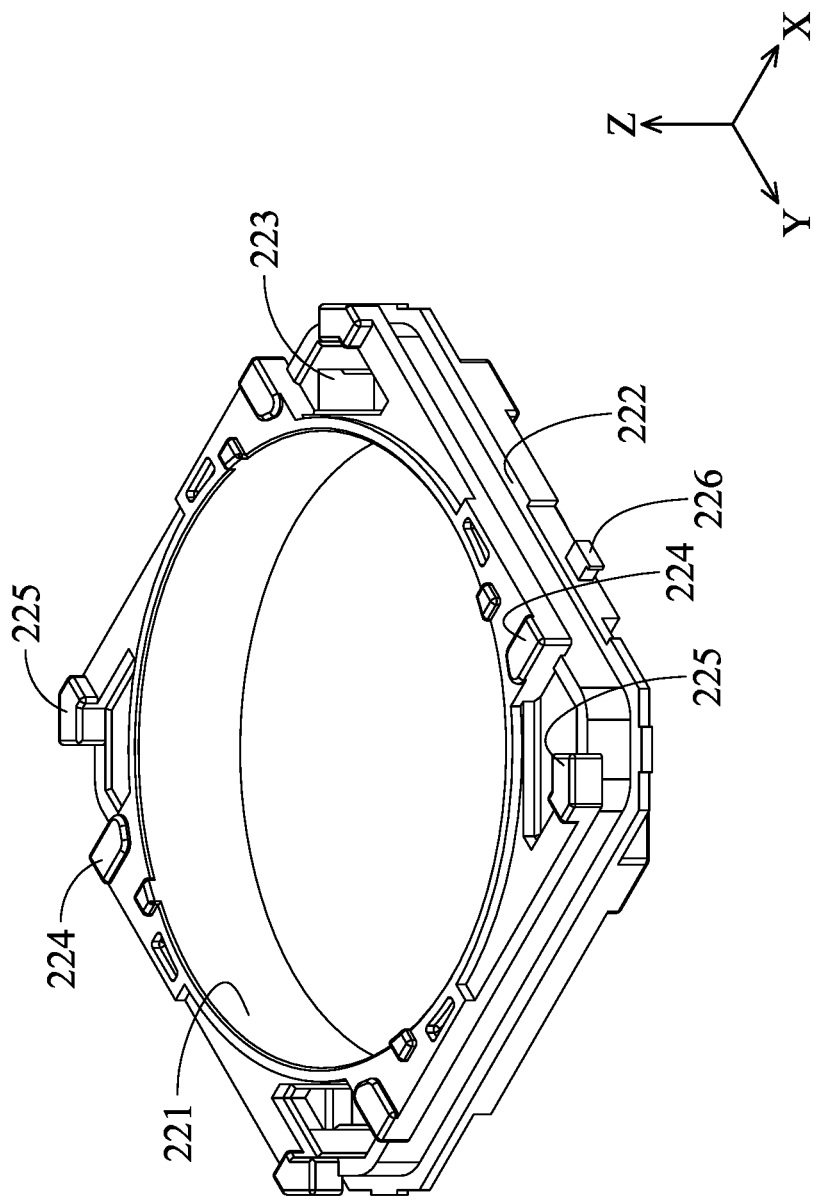
FIG. 4 is a schematic diagram of an optical member holder according to an embodiment of the invention.

As shown in FIG. 4, the optical member holder 220 has an accommodating space 221, a concave structure 222, a depression portion 223, a plurality of first protrusions 224, a plurality of second protrusions 225, and at least one pillar 226. The accommodating space 221 is formed at the center of the optical member holder 220, and the optical member 30 can be affixed to the optical member holder 220 and accommodated in the accommodating space 221. The concave structure 222 is formed on the outer wall of the optical member holder 220 and surrounds the accommodating space 221. The first and second protrusions 224 and 225 are formed on the surfaces of the optical member holder 220 contacting the first and second elastic members 240 and 250. When the first and second elastic members 240 and 250 are connected to the optical member holder 220, the first and second protrusions 224 and 225 protrude from the first and second elastic members 240 and 250.

Referring to FIG. 3, the first electromagnetic driving assembly 310 of the first driving module is disposed in the concave structure 222 of the optical member holder 200, and the second electromagnetic driving assembly 320 is disposed on the housing. The optical member holder 220 and the optical member 30 can be driven to move relative to the housing along the Z-axis (a first direction) by the electromagnetic effect between the first electromagnetic driving assembly 310 and the second electromagnetic driving assembly 320. For example, in this embodiment, the first electromagnetic driving assembly 310 can be a driving coil, and the second electromagnetic driving assembly 320 can comprise at least one magnet. When a current flows through the driving coil (the first electromagnetic driving assembly 310), the electromagnetic effect is generated between the driving coil and the magnet. Thus, the optical member holder 220 and the optical member 30 disposed thereon can be driven to move relative to the housing along the Z-axis.

It should be noted that, in this embodiment, the second elastic member 250 is connected to the pillar 226 of the optical member holder 220. The second electromagnetic driving assembly 320 comprises at least one first magnet 320A and at least one second magnet 320 B, wherein the second magnet 320B and the pillar 226 are disposed on the same side of the optical member holder 220, and the first magnet 320A and the pillar 226 are disposed on the different sides of the optical member holder 220. In order to reduce the dimensions of the optical member driving mechanism, the length of the second magnet 320B is less than that of the first magnet 320A. As observed from the longitudinal axis of the second magnet 320B, the second magnet 320B and the pillar 226 are partially overlapped. Thus, the optical member driving mechanism can be miniaturized without losing a large amount of driving force.

Furthermore, since the first and second protrusions 224 and 225 protrude from the first and second elastic members 240 and 250, the first and second protrusions 224 and 225 can firstly contact the seat 110 or the outer frame 120 when the optical member holder 220 moves relative to the housing, and the damage of the first and second elastic members 240 and 250 due to the collision with the seat 110 or the outer frame 120 can be avoided. Moreover, the area and the height of each of the second protrusions 225 can be greater than that of each of the first protrusions 224, so as to further miniaturize the optical member driving mechanism. Therefore, when the first and second protrusions 224 and 225 are collided, the total pressure received by the second protrusions 225 is greater than the total pressure received by the first protrusions 224. The impact force can be dispersed, and the damage of the protrusions can be prevented. Since both first and second protrusions 224 and 225 are centrosymmetric around the optical member holder 220 (eight in total), the skew of the optical member holder 220 when the first and second protrusions 224 and 225 contact the seat 110 or the outer frame 120 can be avoided. Furthermore, a damping material (such as a gel) can be disposed between the protruding portions on the corners of the base 210 and the first protrusions 224. Unnecessary shaking can be reduced, and the space can be used effectively. Moreover, the range of motion of the optical member holder 220 in the direction of the Z-axis can be restricted by the first and second elastic members 240 and 250.

Figure 5:
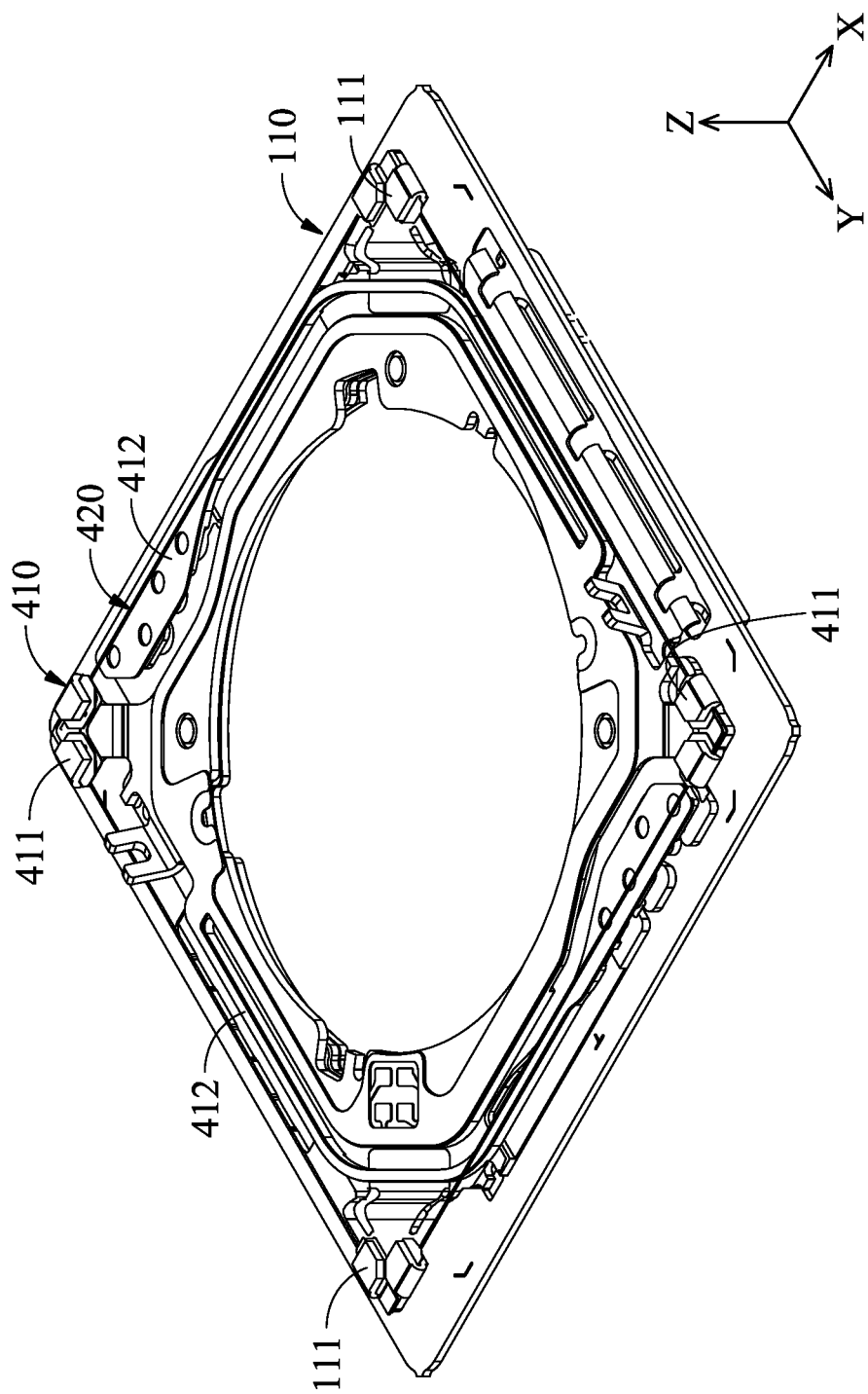
FIG. 5 is a schematic diagram of a seat, a flexible member, and a biasing assembly according to an embodiment of the invention.

The second driving module can drive the movable module to move relative to the fixed module along the X-axis and/or the Y-axis (a second direction). As shown in FIGS. 2 and 5, in this embodiment, the biasing assembly 420 of the second driving module has four elongated biasing wires that correspond to the four sides of the seat 110 (with a substantially rectangular structure). The opposite ends of each biasing wire are respectively connected to the fixed portion 111 of the seat 110 and the connecting portion 411 of the flexible member 410. The base 210 of the movable module is affixed to the flexible member 410.

When applying one or more driving signals (such as a current) to heat the biasing assembly 420, the biasing assembly 420 is able to deform (e.g., become elongated or shortened). When the application of the driving signals is stopped, the deformed biasing assembly 420 will recover to its original length. In other words, by applying one or more appropriate driving signals, the length of the biasing assembly 420 can be controlled to move the flexible member 410 and the movable module relative to the seat 110. Thus, the purpose of image stabilization can be achieved.

The movement of the movable module relative to the seat 110 can comprise the translational motion and the rotational motion. When appropriate drive signals are applied to the two biasing wires which are opposite each other in FIG. 5, causing them to elongate and contract, respectively (the elongated biasing wire elongates toward the connecting portion 411; the contracted biasing wire contracts toward the fixed portion 111), the biasing assembly 420 forces the movable module connecting to the flexible member 410 to move linearly with respect to the seat 110. Similarly, when applying appropriate drive signals to these two biasing wires, causing both them to contract, the biasing assembly W forces the movable portion 30 to rotate relative to the seat 110.

The aforementioned biasing assembly 420 can be a plurality of biasing wires having a shape-memory alloy (SMA) material, and the lengths of the biasing wires can be changed by applying driving signals thereto from an external power source. For example, the biasing assembly 420 can comprise a titanium-nickel (TiNi) alloy, a titanium-palladium (TiPd) alloy, a titanium-nickel-copper (TiNiCu) alloy, a titanium-nickel-palladium (TiNiPd) alloy, or a combination thereof.

In this embodiment, the flexible member 410 (such as a sheet spring) comprises a metal material, has a substantially rectangular structure, and includes two L-shaped arms 412. Each of arms 412 comprises three layers, in particular, a wire layer can be disposed on an insulation layer, and another insulation layer can cover the wire layer. Sequentially, one or more openings can be formed on the insulation layer covering the wire layer, and the wire layer can be exposed from the openings. The exposed wire layer can be electrically connected to other members, so as to prevent a short circuit and an open circuit.

For example, the arms 412 can be connected to the conductive wires (not shown) formed on the seat 110 and the base 210, wherein the conductive wires (not shown) is formed on the seat 110 and the base 210 by insert molding or using a molded interconnect device (MID). Thus, those conductive wires can be connected to the four biasing wires via the flexible member 410 to form four respective independent circuits, and the driving signals can be supplied to those biasing wires respectively from an external power source via the conductive wires. The length of each of the biasing wires can be changed, and the movable module can move relative to the seat 110.

It should be noted that, since the conductive wires on the seat 110 and/or the base 210 are formed by insert molding or using the molded interconnect device, the number of additional wires that are required can be reduced. The number of components of the optical member driving mechanism 10 can be reduced, and the dimensions thereof can be greatly decreased.

For example, using the molded interconnect device comprises laser direct structuring (LDS), microscopic integrated processing technology (MIPTEC), laser induced metallization (LIM), laser restructuring print (LRP), an aerosol jet process, or a two-shot molding method.

Figure 6:
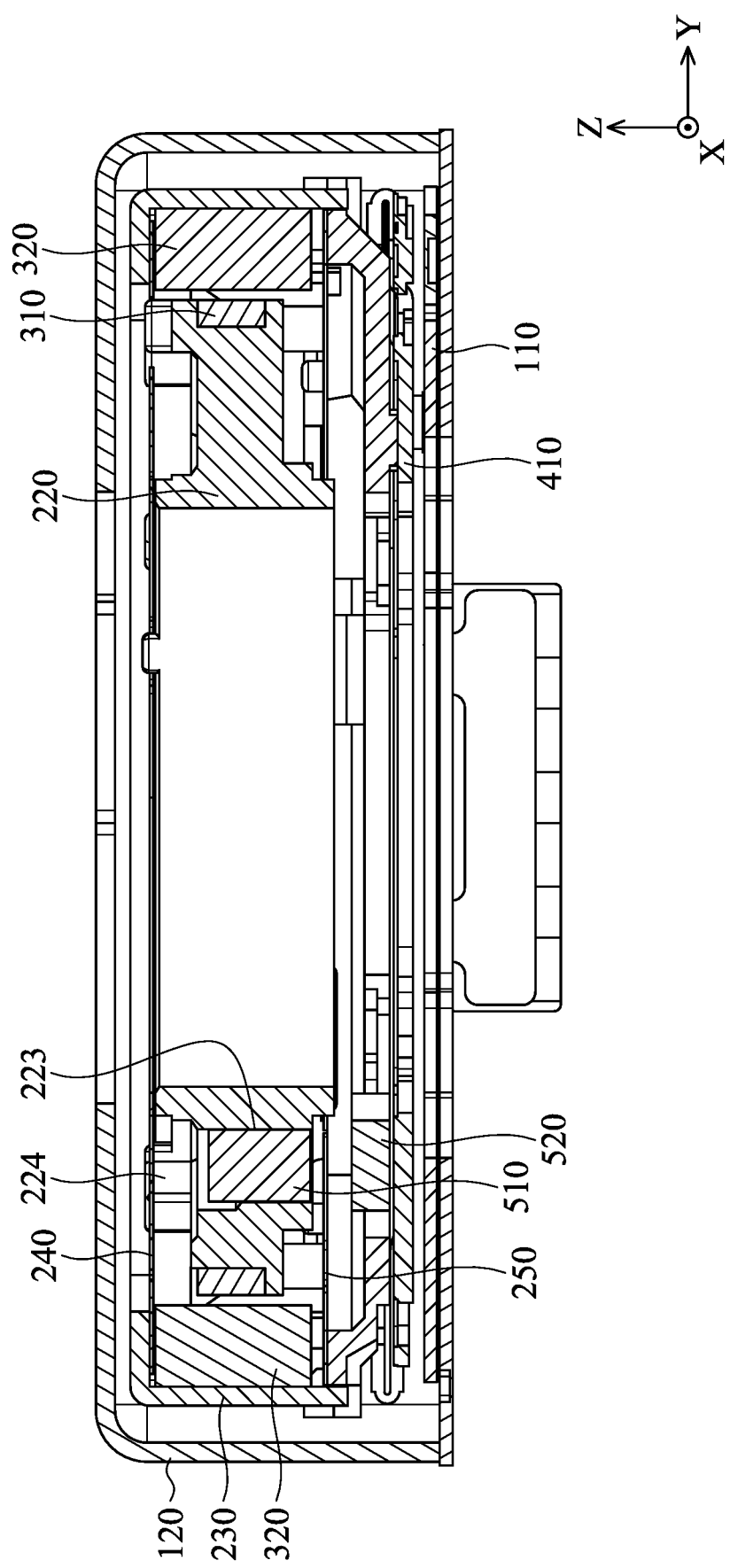
FIG. 6 is a cross-sectional view along the line A-A in FIG. 2.

FIG. 6 is a cross-sectional view along the line A-A in FIG. 2. Referring to FIGS. 3 and 6, the magnetic member 510 of the position detecting module is affixed to the optical member holder 220, and the position detector 520 is affixed to the flexible member 410 and electrically connected to the wire of the flexible member 410. The projection of the position detector 520 on the seat 110 is separated from the projection of the second electromagnetic driving assembly 320 on the seat 110, and overlaps the projection of the magnetic member 510 on the seat 110. In this embodiment, the magnetic member 510 is affixed to the depression portion 223 of the optical member holder 220 by the glue (not shown), so as to prevent the short circuit due to the overflowing of the glue. In another embodiment, the opening of the depression portion 223 faces the seat 110, and the magnetic member is disposed in the opposite direction. Therefore, there is no optical member holder 220 between the magnetic member and the position detector, and a better detecting effect can be achieved.

Figure 7A:
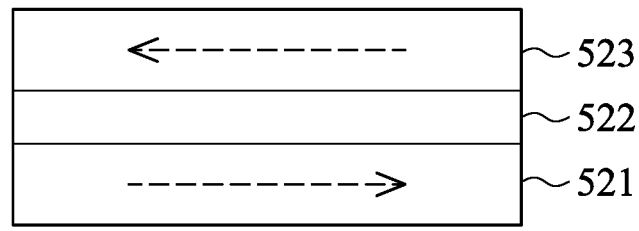
FIG. 7A is a schematic diagram of a position detector according to an embodiment of the invention, wherein the magnetic field direction of the pin layer is opposite to the magnetic field direction of the free layer.
Figure 7B:
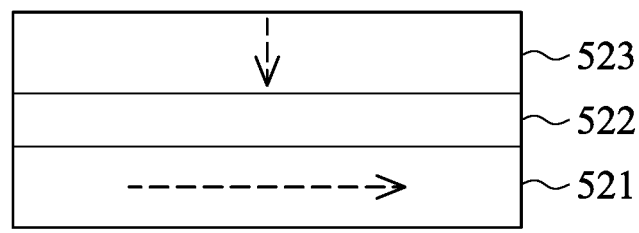
FIG. 7B is a schematic diagram of a position detector according to an embodiment of the invention, wherein the magnetic field direction of the pin layer is different from the magnetic field direction of the free layer.
Figure 7C:
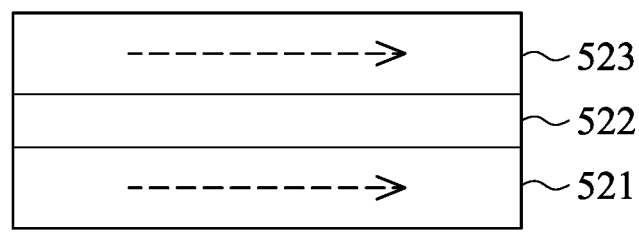
FIG. 7C is a schematic diagram of a position detector according to an embodiment of the invention, wherein the magnetic field direction of the pin layer is the same as the magnetic field direction of the free layer.

The aforementioned position detecting module can detect the relative position between the optical member holder 220 and the housing. The detecting method of the position detecting module is discussed below. As shown in FIGS. 7A-7C, the position detector 520 can be a tunneling magnetoresistance effect sensor (TMR), comprising a pin layer 521, an insulation layer 522, and a free layer 523, wherein the insulation layer 522 is disposed between the pin layer 521 and the free layer 523.

The pin layer 521 can be magnetized and has a fixed magnetic field direction. The magnetic field direction of the free layer 523 can be changed according to the magnetic field direction of the external environment. When the magnetic field direction of the external environment is opposite to the magnetic field direction of the pin layer 521 (FIG. 7A), the position detector 520 has a largest resistance. When the magnetic field direction of the external environment is different from the magnetic field direction of the pin layer 521 (FIG. 7B), the resistance of the position detector 520 is reduced. When the magnetic field direction of the external environment is the same as the magnetic field direction of the pin layer 521 (FIG. 7C), the position detector 520 has a smallest resistance.

Figure 8A:
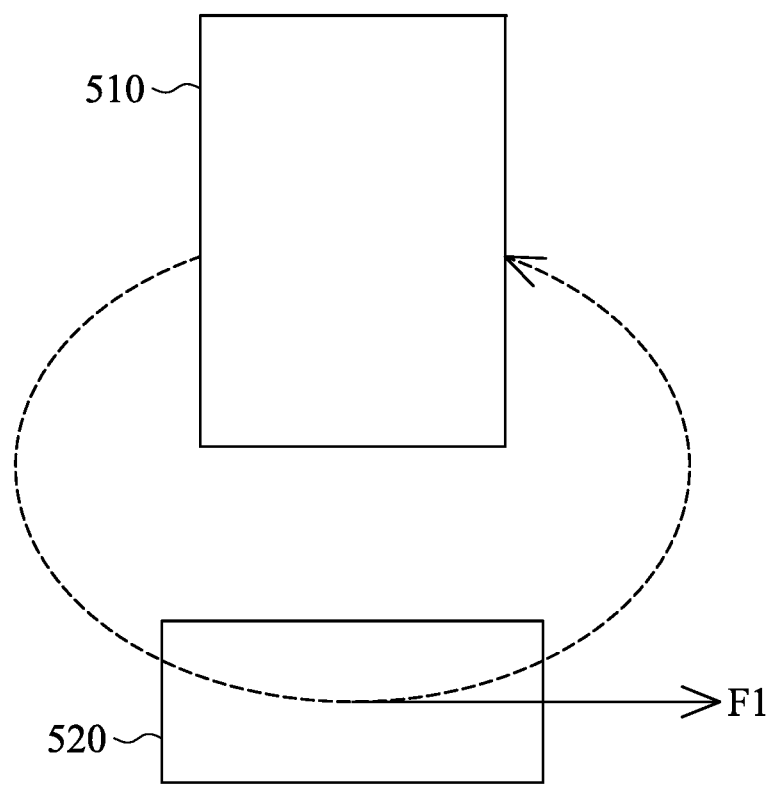
FIG. 8A is a schematic diagram illustrating that a position detector detect the magnetic force from the magnetic member according to an embodiment of the invention.
Figure 8B:
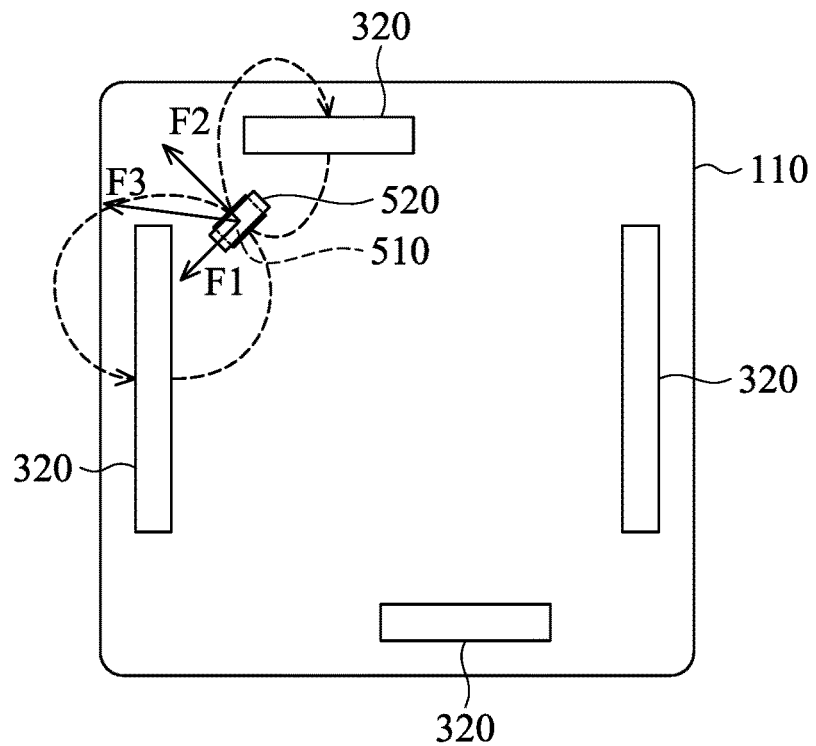
FIG. 8B is a schematic diagram illustrating that a position detector detect the magnetic forces from the magnetic member and the second electromagnetic driving assembly according to an embodiment of the invention.
Figure 8C:
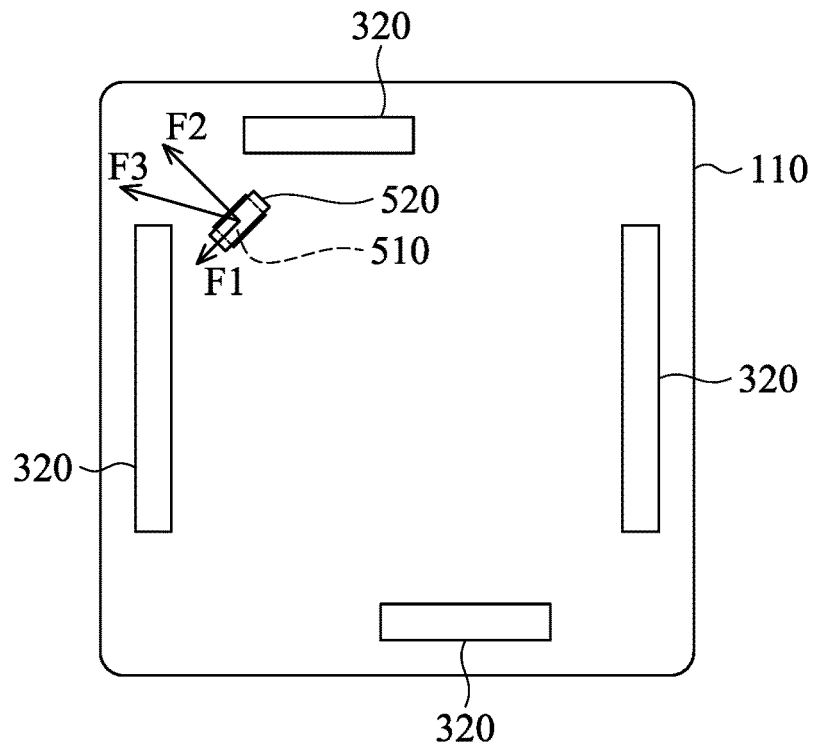
FIG. 8C is a schematic diagram illustrating that a position detector detect the magnetic forces from the magnetic member and the second electromagnetic driving assembly after the optical member holder moves according to an embodiment of the invention.

Referring to FIGS. 8A and 8B, the position detector 520 can detect the magnetic force F1 of the magnetic member 510 and the magnetic force F2 of the second electromagnetic driving assembly 320 (the dotted lines in the figures represent the line of magnetic force). Thus, the magnetic field direction of the free layer 523 of the position detector 520 is F3. As shown in FIG. 8C, when the first driving module drives the optical member holder 220 and the magnetic member 510 to move away from the position detector 520, the magnetic force F1 received by the position detector 520 is reduced, and the magnetic field direction F3 changes. Therefore, the position detector 520 can detect the position of the optical member holder 220 relative to the housing according to the magnetic field direction F3.

The lines of magnetic force in the magnetic member 510 and the second electromagnetic driving assembly 320 are different from the direction of Z-axis, and the line of magnetic force in the magnetic member 510 is different from that in the second electromagnetic driving assembly 320, so as to prevent the impact on the movement of the optical member holder 220 due to the attraction or the repulsion. It should be noted that, when the angle between the magnetic field direction of the pin layer 521 and the magnetic field direction of the free layer 523 is 45 degree to 135 degree, the variation of the resistance of the position detector 520 in linear. The user can define the magnetic field direction of the pin layer 521 according to the variation of the magnetic field direction F3, so as to enhance the accuracy of the detection.

For example, in this embodiment, the angle between the line of magnetic force in the magnetic member 510 and the line of magnetic force in the second electromagnetic driving assembly 320 is 45 degree, and the user can define the magnetic field direction of the pin layer 521 to perpendicular to the line of magnetic force in the magnetic member 510. Therefore, the angle between the magnetic field direction of the pin layer 521 and the magnetic field direction of the free layer 523 is 45 degree to 135 degree during the movement of the optical member holder 220 relative to the housing.

Figure 8D:
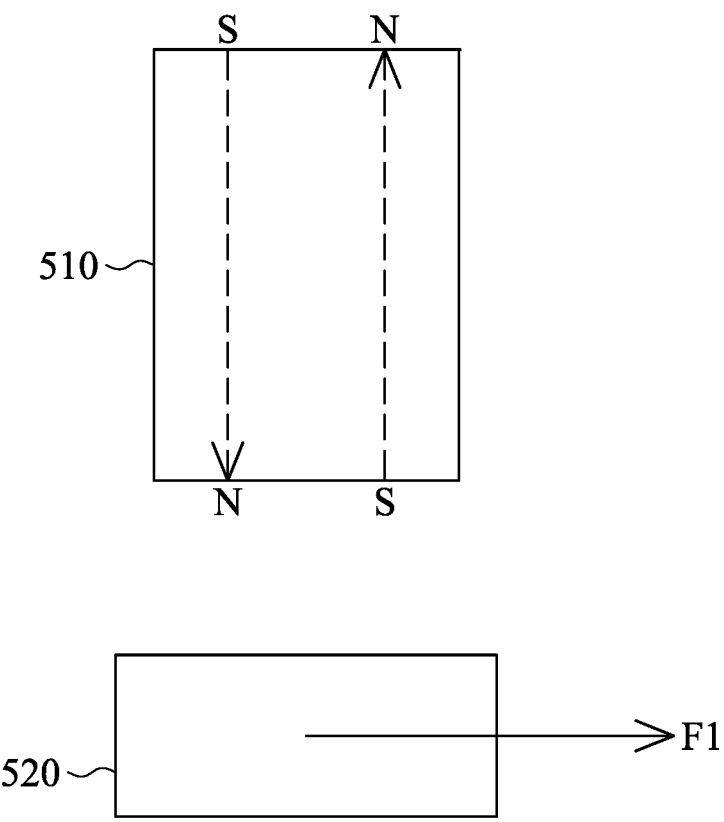
FIG. 8D is a schematic diagram of a position detector and a magnetic member according to another embodiment of the invention.

Referring to FIG. 8D, in another embodiment, the magnetic member 510 comprises two sets of poles (such as a mutipole magnet or an assembly having a plurality of magnets), and the direction of poles of each set is parallel and opposite. Thus, the region having strong magnetic force can concentrate on the position detector 520, and the line of magnetic force is intensive, and the electromagnetic interference can be reduced. Furthermore, since the direction of poles of each set is opposite to that of the second electromagnetic assembly 320, the impact on the movement of the optical member holder 220 due to the attraction or the repulsion therebetween can be prevented.

Figure 9:
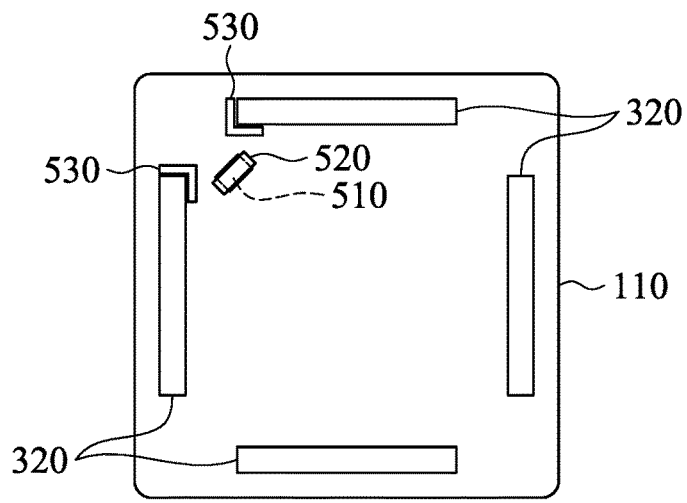
FIG. 9 is a schematic diagram of a position detector, a second electromagnetic driving assembly, and a blocking member according to another embodiment of the invention.

Referring to FIG. 9, in anther embodiment, one or more blocking member 530 can be disposed between the magnetic member 510 and the second electromagnetic driving assembly 320, and between the position detector 520 and the second electromagnetic driving assembly 320. The electromagnetic interference between the magnetic member 510 and the second electromagnetic driving assembly 320 can be prevented, and the influence of the magnetic member 510 during the movement can be enhanced.

Figure 10:
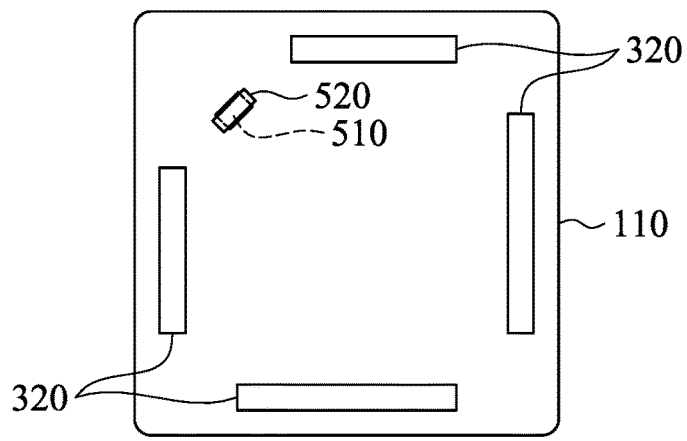
FIG. 10 is a schematic diagram of a position detector and a second electromagnetic driving assembly according to another embodiment of the invention.
Figure 11:
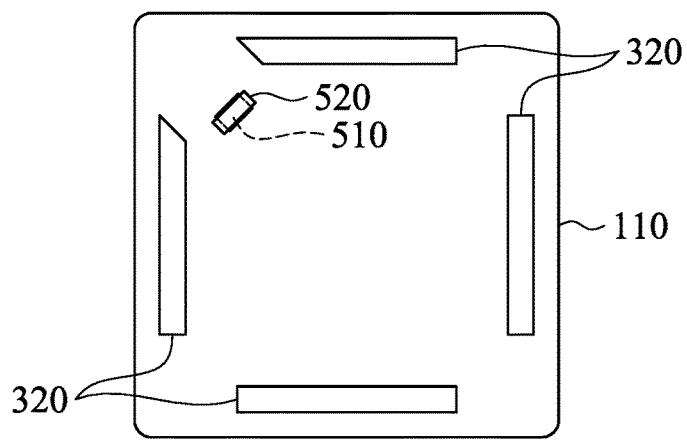
FIG. 11 is a schematic diagram of a position detector and a second electromagnetic driving assembly according to another embodiment of the invention.

In some embodiments, the aforementioned purposes can be achieved by changing the appearance and/or the position of the second electromagnetic driving assembly 320. For example, as shown in FIG. 10, in another embodiment, the distance between the second electromagnetic driving assembly 320 and the position detector 520 is less than the distance between another second electromagnetic driving assembly 320 and the position detector 520, and the length of the second electromagnetic driving assembly 320 is less than the length of another second electromagnetic driving assembly 320. Furthermore, the gap between the position detector 520 and the second electromagnetic driving assembly 320 in this embodiment is greater than that in the aforementioned embodiment. As shown in FIG. 11, in anther embodiment, the second electromagnetic driving assembly 320 has a trapezoid-shaped structure, and the inclined leg of the trapezoid-shaped structure faces the position detector 520.

Figure 12A:
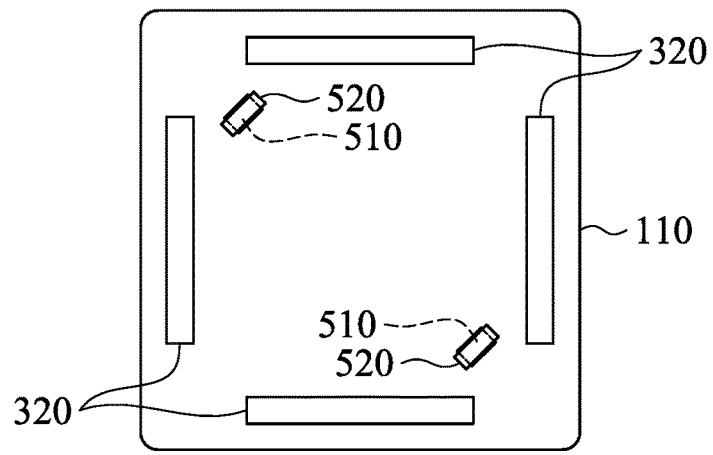
FIG. 12A is a schematic diagram of a position detector and a second electromagnetic driving assembly according to another embodiment of the invention.
Figure 12B:
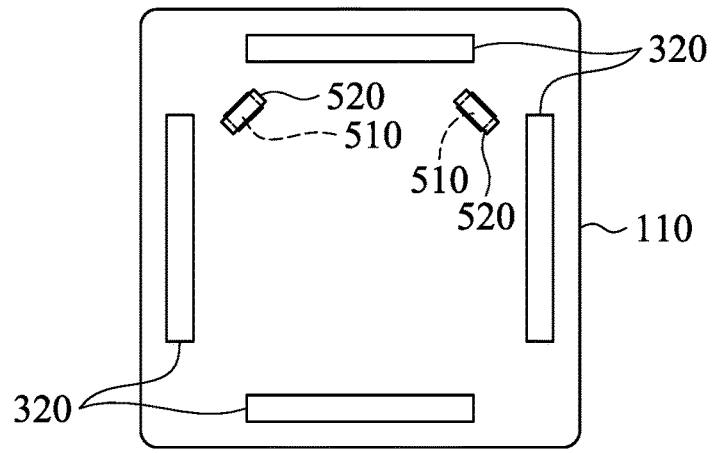
FIG. 12B is a schematic diagram of a position detector and a second electromagnetic driving assembly according to another embodiment of the invention.

Referring to FIGS. 12A and 12B, in some embodiments, a plurality of position detecting modules are arranged for preventing the optical member holder 220 from skewing in the movement. The position detecting modules can be disposed on the same side or the opposite corners of the seat 110 as required.

Figure 13:
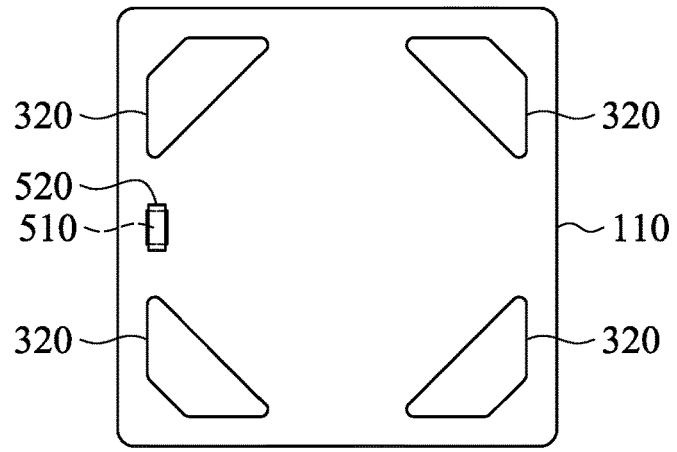
FIG. 13 is a schematic diagram of a position detector and a second electromagnetic driving assembly according to another embodiment of the invention.

In the aforementioned embodiments, the second electromagnetic driving assembly 320 is adjacent to the side of the seat 110, and the position detector 520 and the magnetic member 510 are adjacent to the corner of the seat 110. As shown in FIG. 13, in another embodiment, the second electromagnetic driving assembly 320 is adjacent to the corner of the seat 110, and the position detector 520 and the magnetic member 510 are adjacent to the side of the seat 110.

Figure 14:
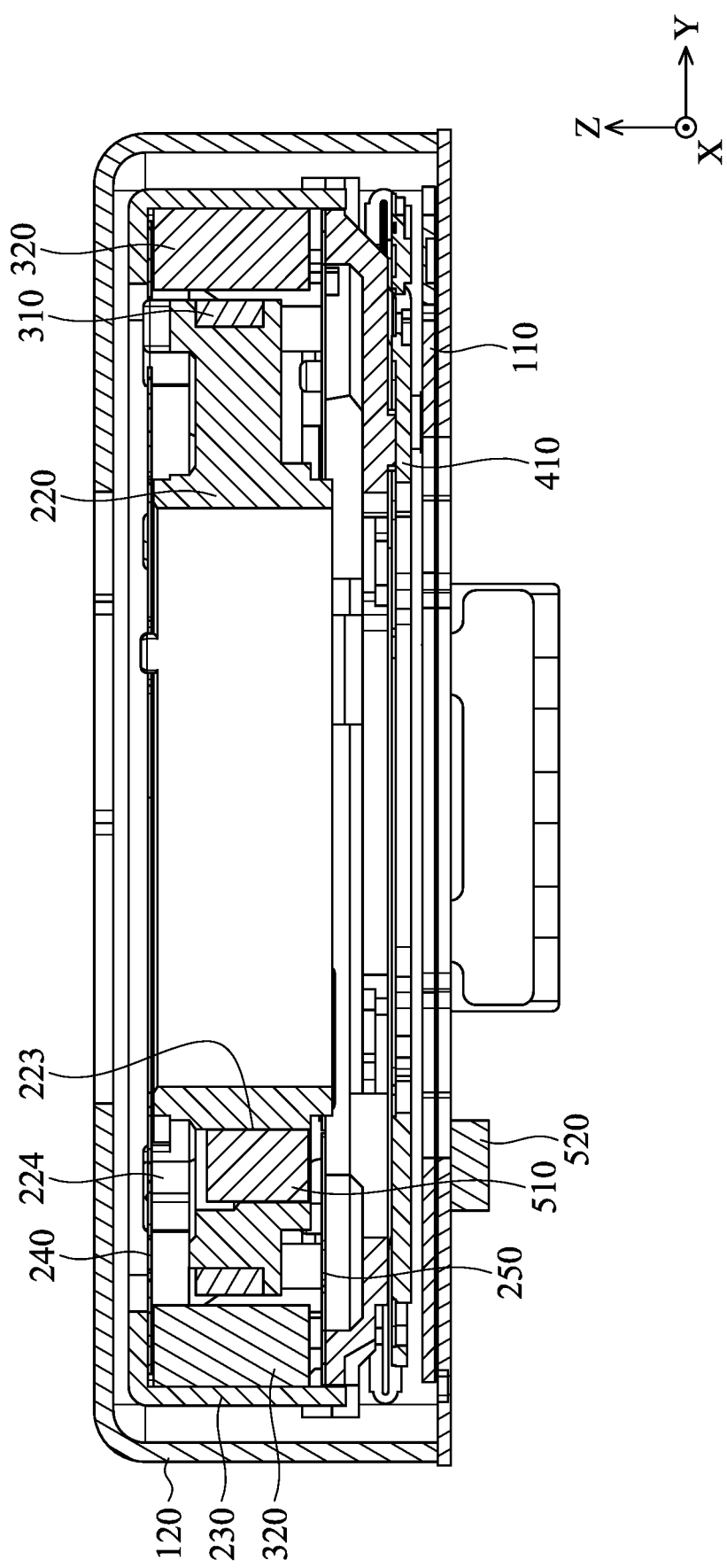
FIG. 14 is a schematic diagram of an optical member driving mechanism according to another embodiment of the invention.
Figure 15:
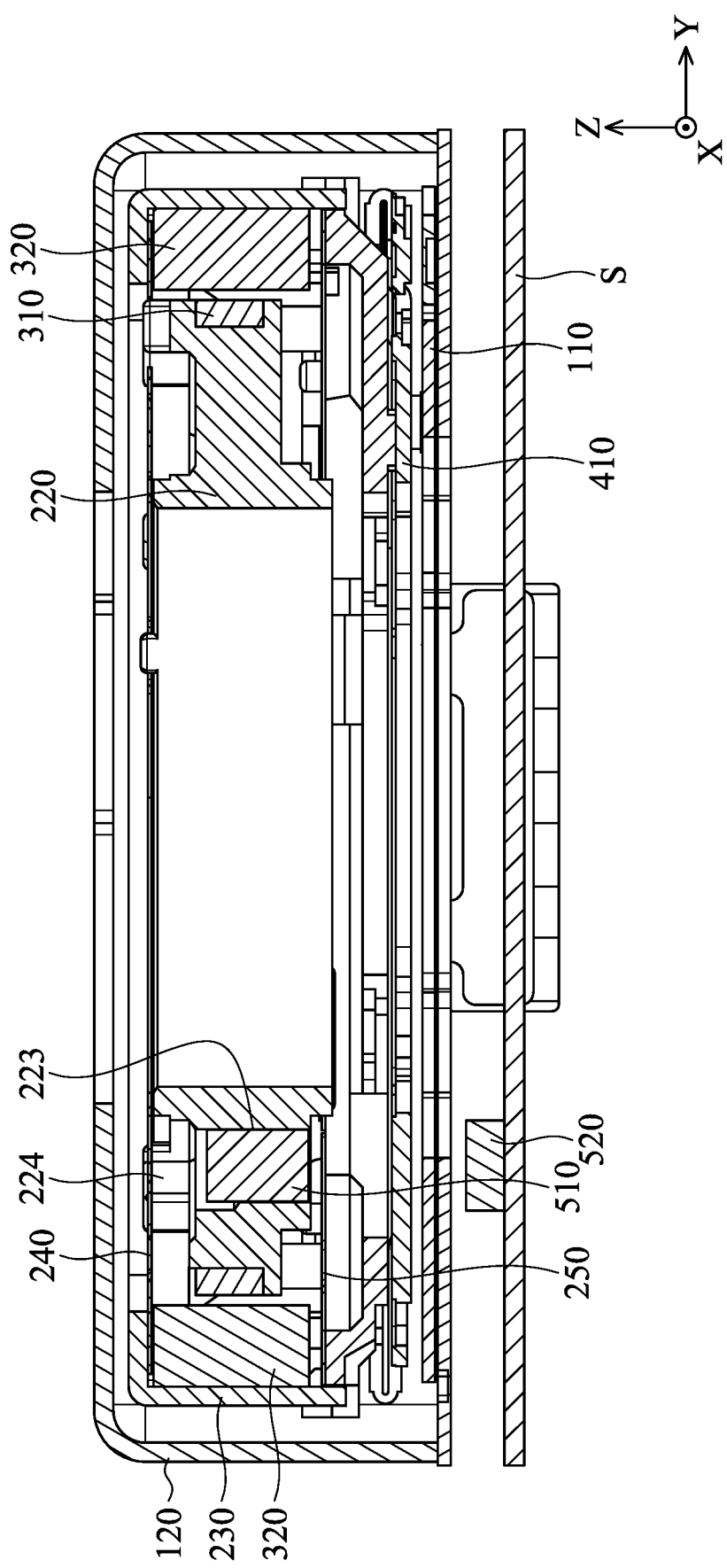
FIG. 15 is a schematic diagram of an optical member driving mechanism according to another embodiment of the invention.

As shown in FIG. 14, in another embodiment, the position detector 520 can be disposed on the seat 110, and the collision between the position detector 520 and the movable module can be prevented. As shown in FIG. 15, in another embodiment, the position detector 520 can be disposed on image sensor S, which is disposed under the optical member driving mechanism 10, therefore, the volume of the optical member driving mechanism 10 can be further reduced.

In summary, an optical member driving mechanism is provided, including a movable module, a first driving module, and a position detecting module. The movable module includes an optical member holder and a housing. The first driving module includes a first electromagnetic driving assembly disposed on the optical member holder and a second electromagnetic driving assembly disposed on the housing. The first driving module can drive the optical member holder to move relative to the housing. The position detecting module includes a magnetic member and a position detector. The magnetic member is disposed on the optical member holder. The position detector can detect the position of the optical member holder relative to the housing according to a variation in magnetic field direction.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable module, comprising a holder and a housing, wherein the holder is configured to connect an optical member and is movable relative to the housing;
   a first driving module, configured to drive the holder to move relative to the housing; and
   a position detecting module, configured to detect the movement of the holder relative to the housing along a first direction, wherein the position detecting module comprises:
   a magnetic member, comprising a first N pole and a first S pole, wherein the first N pole and the first S pole are arranged along the first direction; and
   a position detector, detecting the movement of the holder relative to the housing by measuring the magnetic field generated from the first N pole and the first S pole;
   wherein the magnetic member does not overlap the position detector as seen from all directions that are perpendicular to the first direction.

2. The optical member driving mechanism as claimed in claim 1, wherein the position detector is configured to detect a first magnetic field direction, and the first magnetic field direction is perpendicular to the first direction.

3. The optical member driving mechanism as claimed in claim 2, wherein the position detector is configured to detect a second magnetic field direction, and the second magnetic field direction is perpendicular to the first direction.

4. The optical member driving mechanism as claimed in claim 3, wherein the first magnetic field direction is not parallel to the second magnetic field direction.

5. The optical member driving mechanism as claimed in claim 1, wherein the first driving module comprises a drive magnetic member and a coil, the drive magnetic member comprises a second N pole and a second S pole, the second N pole and the second S pole are arranged along a second direction, and the second direction is not parallel to the first direction.

6. The optical member driving mechanism as claimed in claim 5, wherein the drive magnetic member overlaps the position detector as seen from a direction that is perpendicular to the first direction.

7. The optical member driving mechanism as claimed in claim 5, wherein the drive magnetic member includes a magnet, the magnetic member includes another magnet, and the distance between the drive magnetic member and the magnetic member is greater than zero.

8. The optical member driving mechanism as claimed in claim 5, wherein the drive magnetic member includes a magnet, the magnetic member includes another magnet, and the magnetic member is movable relative to the drive magnetic member along the first direction.

9. The optical member driving mechanism as claimed in claim 1, wherein the magnetic member further comprising a third N pole and a third S pole, and the third N pole and the third S pole are arranged along the first direction.

10. The optical member driving mechanism as claimed in claim 9, wherein the arrangement direction of the first N pole and the first S pole is opposite to the arrangement direction of the third N pole and the third S pole.

11. The optical member driving mechanism as claimed in claim 9, wherein the first driving module further comprises a drive magnetic member and a coil, the drive magnetic member comprises a second N pole and a second S pole, and the arrangement direction of the first N pole and the third S pole is not parallel to the arrangement direction of the second N pole and the second S pole.

12. The optical member driving mechanism as claimed in claim 9, wherein the first driving module further comprises a drive magnetic member and a coil, the drive magnetic member comprises a second N pole and a second S pole, and the arrangement direction of the first N pole and the third S pole is not perpendicular to the arrangement direction of the second N pole and the second S pole.

13. The optical member driving mechanism as claimed in claim 1, wherein the optical member driving mechanism further comprises a fixed module and a second driving module, the second driving module is connected to the movable module and the fixed module and configured to drive the movable module to move along a second direction relative to the fixed module, wherein the second direction is different from the first direction.

14. The optical member driving mechanism as claimed in claim 13, wherein the second driving module comprises a biasing assembly, connected to the movable module and the fixed module.

15. The optical member driving mechanism as claimed in claim 14, wherein the second driving module further comprises a flexible member, disposed between the movable module and the fixed module and connected to the biasing assembly.

16. The optical member driving mechanism as claimed in claim 15, wherein the position detector is disposed on the flexible member.

17. The optical member driving mechanism as claimed in claim 15, wherein the opposite ends of the biasing assembly are respectively affixed to the fixed module and the flexible member.

18. The optical member driving mechanism as claimed in claim 1, wherein the first driving module comprises a plurality of drive magnetic members, and the dimensions of one of the drive magnetic members closer to the position detector are smaller than the dimensions of another one of the drive magnetic members away from the position detector.

19. The optical member driving mechanism as claimed in claim 1, wherein the first driving module comprises a drive magnetic member, and the drive magnetic member includes an inclined surface facing the position detector.

20. The optical member driving mechanism as claimed in claim 1, wherein the position detector comprises a pin layer, an insulation layer, and a free layer, and the insulation layer is disposed between the pin layer and the free layer.

* * * * *